Feb. 28, 1950  J. G. BEARD ET AL  2,498,871
PHASE DETECTION AND TUNER CONTROL SYSTEM
Filed Feb. 9, 1945
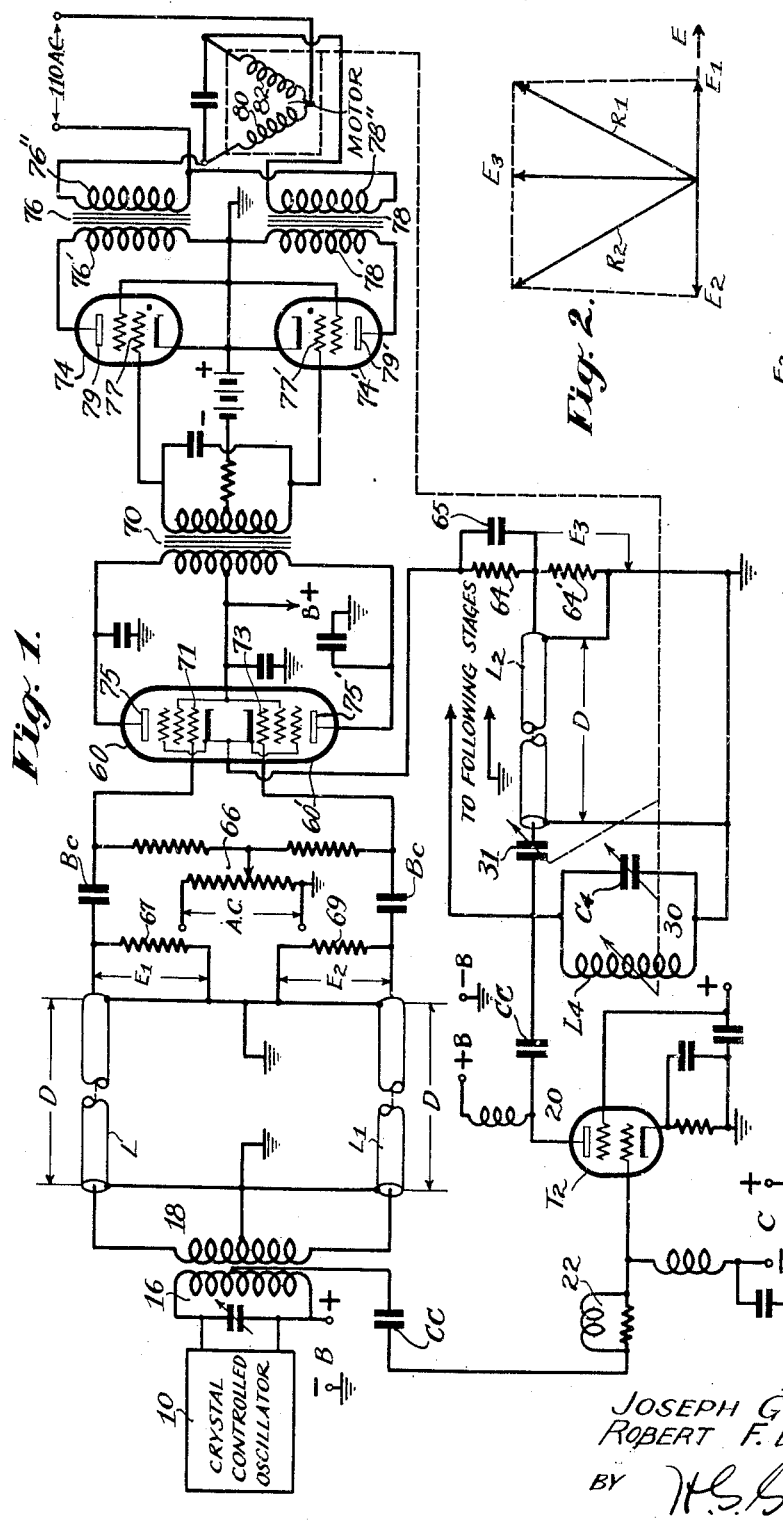
INVENTORS.
JOSEPH G. BEARD
ROBERT F. DRESSLER
BY H. S. Grover
ATTORNEY Patented Feb. 28, 1950

2,498,871

UNITED STATES PATENT OFFICE 2,498,871

PHASE DETECTION AND TUNER CONTROL SYSTEM

Joseph G. Beard, Haddonfield, N. J., and Robert F. Dressler, Philadelphia, Pa., assignors to Radio Corporation of America, a corporation of Delaware Application February 9, 1945, Serial No. 577,043

5 Claims. (Cl. 250—40)

In our U. S. application Serial #577,042, filed February 9, 1945, which has now ripened into Patent #2,469,324, dated May 3, 1949, we disclosed an improved method of and means for automatically tuning one or more radio frequency stages such as, for example, wave generators, alternating current relays, amplifiers, frequency multipliers, etc. In this application we describe and claim in detail the phase comparison and detector system and motor control and tuner system used in the said application. This phase comparison detecting system and motor control and tuner system is obviously of general application and may be used in systems other than that disclosed in the said application.

In attaining the objects of the said application, currents appearing in two circuits or at two points in a circuit are compared as to relative phases, relative phase variations are detected and the detected currents when present used to control a motor to retune one of said circuits to reestablish a desired phase relation between the said currents.

A general object of this invention is improvement in current phase comparison and current phase variation detection.

In attaining this object we make use of one or more electron discharge devices to which currents from the respective circuits are applied in a particular phase relation when the two circuits are correspondingly tuned. When one of the circuits becomes mistuned its current phase and/or amplitude changes and the changes are detected. It is essential that the currents be applied to the detectors in proper phase relation, and an object of our invention is improved means for applying the currents from the respective circuits to the phase detectors. In the embodiment illustrated, this means includes coaxial cables of like length coupling the circuits to the phase detectors.

Obviously, it is essential that the phase relation of the currents supplied from the circuits to the lines be initially of a proper desired phase relation. Where a single frequency or a narrow frequency range is involved, a simple phase shifting network may suffice. However, we contemplate use of a wide range of frequencies, and the circuit tuned is to be tunable over this wide range. Where the circuits are to operate over a wide frequency range known fixed phase shifting networks are inadequate since the phase shift provided thereby changes with current frequency. Another object of our invention is provision of a phase shifting network including a reactance varied in accordance with the detected currents as the circuit is tuned, the network being thereby arranged to supply currents of the said desired fixed phase relation to the line inputs over the entire range of tuning of the circuits.

The phase detector includes a pair of tubes excited equally and differentially by currents from one circuit and equally and cophasally by current from the other circuit and the tube outputs balance when the circuits are like tuned. One tube output predominates when the circuits are not like tuned. This output is used to control the direction of rotation of a motor, and an object of our invention is improved motor control by alternating currents. In attaining this object alternating current from a power supply say 60 cycle alternating current is supplied cophasally to the phase detectors to provide in the output of one thereof when tuning is not proper alternating current power which is applied to thyratron tubes which have related to their anode circuits alternating current supply connections through the windings of a two winding motor, the arrangement being such as to run the motor in the proper direction when the circuits are not properly tuned. The motor drives a variable reactance to retune one of the circuits and also adjusts a reactance in the phase shifting network so that irrespective of changes in the frequency of the wave energy the current from the tunable circuit fed to the line is properly related in phase to the current fed from the other circuit to the other lines.

In describing our invention in detail, reference will be made to the attached drawings wherein Fig. 1 illustrates partly by block diagram but mainly by circuit connections, a phase comparison and detecting circuit arrange in accordance with our invention, and associated with a source of oscillations and with a tunable circuit with a motor for tuning the same, and a motor control circuit connecting the phase detector to the motor.

Figs. 2 and 3 illustrate by vector diagram the manner in which the currents from the source and the circuit to be tuned are compared as to phase in a detector and operate therein to produce an output for controlling the motor.

The phase detector and motor control and tuner here is in general as disclosed in our said U. S. Patent #2,469,324. Here, however, in the sake of simplicity, two tuned circuits only are shown, one of which may be said to be the source of current and the other of which is tunable. Moreover, the showing here does not include the automatic means for tuning the circuits to their lowest frequency under certain conditions, nor to a higher selected frequency under other conditions as in the said application. In the drawings we have, however, used symbols corresponding to those used in said other application in so far as possible.

In Fig. 1, 16 represents a tuned circuit wherein oscillatory energy appears. The oscillatory energy may be such as would be produced by a crystal controlled oscillator in 10, or some other source the frequency of which may be varied or changed, or may vary in an undesired manner. The oscillatory energy may be modulated or unmodulated. The oscillatory energy is fed by a coupling condenser CC to the control grid of an electron discharge tube T2. This coupling may include a parasitic damping resistance and inductance 22. The tube T2 may be an amplifier and may have its output coupled by a coupling condenser CC to a tunable circuit 30 and coupled thereby to following stages as desired. The circuit 30 is, as stated above, tunable, and a feature of this invention includes automatic means for tuning the circuit 30 to the frequency of the current or oscillatory energy supplied or appearing in circuit 16 in the presence of changes in the frequency thereof. It is assumed that the circuit 16 is tuned to the frequency of the oscillatory energy produced or appearing therein.

The inductance of the circuit 18 is coupled to the inductance of circuit 16 and may be considered the secondary winding of a transformer having as a primary winding the inductance of circuit 16. The inductance 18 is connected to ground at about its electrical center and thence to the cathodes of two electron discharge systems 60 and 60'. These systems may be in individual envelopes or in a single envelope as shown. The ends of the inductance of circuit 18 are coupled by lines L and L1 through condensers Bc and Bc to the control grids 71 and 73 respectively of the electron discharge systems 60 and 60'. The grid ends of the lines L and L1 are coupled to ground by impedances 67 and 69 and radio frequency voltages E1 and E2 appearing across these impedances are fed differentially to the grids 71 and 73 of the electron tube systems 60 and 60'.

The cathodes of the tube systems 60 and 60' are maintained above ground radio frequency potential by an impedance arrangement 64, 64' and the output of tuned circuit 30 of the stage 20 is supplied by a phasing condenser 31 and a line L2 to a point on the impedances 64, 64' to feed the radio frequency current from the circuit 30 through bypass condenser 65 in phase to both cathodes of the discharge systems 60 and 60'. There is a 90° phase change of the voltage fed through the condenser 31 over resistance 64' to the cathodes of the discharge systems 60 and 60'. This radio frequency voltage is designated as E3 herein. Direct current bias circuits for the control grids 71 and 73 of tube systems 60 and 60' are completed by means of a potentiometer resistance 66, a point on which is connected through balancing resistances to the grids 71 and 73 of the tube systems 60 and 60'. The resistance 66 serves also as a means for applying the 60 cycle alternating current from a power supply source, not shown, cophasally to the grids 71 and 73. The 60 cycle current applied between one end of resistance 66 and ground may be derived from the same source used as filament heating current. The anodes 75 and 75' of the electron discharge systems 60 and 60' are supplied by direct current potential from a lead on the primary winding of a 60 cycle transformer 70. As long as the electron discharge systems 60 and 60' are balanced the alternating current bucks out in the primary windings of transformer 70, or is at least ineffective to materially excite the secondary winding thereof. The phase displacement between radio frequency voltages E3 and E1 and E3 and E2 changes the bias of one or the other of the grids 71 or 73 of the discharge systems 60 or 60' to let the said one tube amplify the 60 cycle alternating current more than the other does, and strike one or the other of the tubes 74 and 74', depending on which of the systems 60 or 60' is excited by the radio frequency current of advanced phase. This in turn depends on the phase relation of the radio frequency in the tuned circuit 16 and in circuit 30 to be tuned.

The transformer 70 has its secondary winding coupled in pushpull relation to the control grids 77 and 77' of a pair of gaseous tubes 74 and 74' of the Thyratron type. These tubes have their anodes 79 and 79' coupled in pushpull relation by the secondary windings 76' and 78' of two transformers 76 and 78, the primary windings 76" and 78" of which are in series with two motor windings 80 and 82 respectively. The primary winding of the transformer 76 and the motor winding 80 are in series with an alternating current supply source. The primary winding of the transformer 78 and the motor winding 82 are similarly in series across an alternating current supply source. This supply source may be the same source supplying current to the resistance 66 and it is to be assumed that the currents supplied to windings 80 and 82 and 66 are in synchronism. In the embodiment being described the alternating current supplied to these windings is of 60 cycles and 110 volts, while the alternating current supplied across the resistance 66 is of 60 cycles and 6 volts. This alternating current is induced in the windings 76' and 78' to set up therein voltages which are across the anode to cathode impedances of the tube systems 74 and 74'. If the two gas tube systems 74 and 74' are of high impedance (thyratron with negative or low positive voltage on the grid) the secondaries of the transformers 76 and 78 are unloaded (open circuited) and no current flows in the primary windings of transformers 76 and 78 so the motor cannot turn. If the tubes are of low impedance the transformer secondaries are loaded, so current flows in the primary windings and motor windings. However, since the current in one winding tends to turn the rotor in one direction while the current in the other winding tends to turn the rotor in the other direction, the motor does not turn. In practice the tubes 74 and 74' are alternatively conductive or both non-conductive.

The motor rotor is geared or linked (see dotted line) to tunable reactances L4 and C4 in circuit 30 and to the phasing condenser 31.

The electron discharge devices 60 and 60' comprise a phase detector which compares the phase of the voltage in tank circuit 30 with the phase of the voltage in the tank circuit 16. If we give the voltage across the tank circuit 16 a first phase then by proper coupling of the winding 16 to winding 18 the voltage induced in winding 18 may be of said first phase and this voltage is fed by lines L and L1 differentially to the grids 71 and 73 of tube systems 60 and 60'.

These voltages are designated E1 and E2 and are shown vectorially in Figs. 2 and 3 and represent the voltages applied respectively between the grid 71 and ground, and between the grid 73 and ground. At the same time a voltage E3 is supplied in parallel by line L2 to the cathodes of the tubes 60 and 60' from the circuit 30. The voltage in 30 is of a phase differing from the phase of said first voltage in the circuit 16 by 180°+90° or 270° and therefore it is in quadrature with respect to the voltage in circuit 18, i. e., said first voltage. Assume that the radio frequency voltage in tank circuit 16 is again of said first phase. This voltage is reversed in phase, i. e., displaced in phase 180° by action of tube T2 and shifted in phase 90° by the phase shifter network including condenser 31 and resistances 64 and 64' at the other end of line L2. The phase of voltage E3 is also shown vectorially in Figs. 2 and 3. The phasing network (31, 64, 64') advances the phase of the voltage E3 about 90° so that the voltages fed from line L2 are 90° displaced with respect to the voltages fed from lines L1 and L2 when the circuit 30 is properly tuned, that is, at resonance. To insure that this desired 90° displacement in phase between voltages E1 and E3 and between E2 and E3 is maintained on the electrodes of tubes 60 and 60', the lines L, L1 and L2 are made of like electrical length. Therefore, when the stages 16 and 30 are tuned to the same frequency there will be a substantially exact phase quadrature between the voltages applied to the grids and cathodes of the respective discharge tubes 60 and 60'. Moreover, since they are properly tuned the voltage E3 applied to the cathodes will be larger than the voltages E1 and E2 which are equal. The radio frequency resultants represented by R1 and R2 applied to the tube systems 60 and 60' are equal so that their effects and the amplified 60 cycle alternating currents cancel in the anode circuits. The 60 cycle current being fed cophasally is balanced in the primary winding of pushpull transformer 70 and cancels out or is at least ineffective to strike the tube stages 74 and 74'. This stage, including tubes 74 and 74', is now ineffective to switch the current to one or the other of windings 80 and 82 of the motor and the same will remain at rest in the position at which the circuit 30 is properly tuned.

Now assume that the circuit 30 is improperly tuned in one direction or the other. The phase quadrature relation between radio frequency voltages E1 and E2 and E3 is no longer present. Moreover, the voltage E3 will now be smaller than it is when the circuit 30 is properly tuned and the resultant radio frequency voltages R1 and R2 on the grids 71 and 73 of the tubes 60 and 60' are no longer equal and one of these tubes is more effective as an amplifier than the other, depending on whether the voltage E3 leads or lags the voltage E1 and/or E2. The grid of said one tube section is more positive than the grid of the other and amplifies the 60 cycle current more than the other tube and one or the other grids 77 or 77' of the tubes 74 or 74' is excited by the amplified alternating current power. The anodes of these tubes are also subjected to alternating current power of the same frequency, and on the positive cycles of the anode and grid alternating current the said one tube discharges to, in effect, lower the anode to cathode impedance of this tube (is shorted) and a current flows through that winding of the motor coupled to this one tube during a half cycle of the alternating current applied to its grid. This causes the motor to turn in one direction and the direction of turning is related to the direction of shift of the voltage E3 so as to tune circuit 30 in the proper direction to set up the proper phase relation between the radio frequency voltages in circuits 30 and 16. The next positive cycle of the alternating current also has a similar effect but due to the inertia of the motor the effect is integrated so that the motor turns slowly but continuously in the proper direction to retune the circuit 30 to resonance at the frequency of the current in circuit 16.

The lines connecting the winding 18 and the circuit 30 to the tube systems 60 and 60' may be of any length but must be of equal electrical length to have similar effects on the voltages E1, E2 and E3 and not upset the desired phase relation discussed in detail above. The frequency range involved, i. e., the tuning range, may be considerable, in which case a phase shifting network having fixed values would not supply a voltage E3 displaced in phase 90° from the voltages E1 and E2. In order to insure a proper quadrature relation between voltage E3 and voltages E1 and E2 we make the reactance 31 of the phase shifting network adjustable and control its value by the motor simultaneously with control of the tuning of the circuit 30. Thus, the desired quadrature relation between the voltage E3 and the voltages E1 and E2, necessary at the phase detector tubes 60 and 60' when the system is properly tuned, is maintained throughout the tuner range.

What is claimed is:

1. In apparatus for controlling direction of rotation of a motor, a pair of electron discharge systems each having a plurality of electrodes including output electrodes, connections for applying high frequency voltages of a first phase to corresponding electrodes of said systems, connections for applying high frequency voltages displaced in phase about 90° with respect to said first voltages to corresponding electrodes of said systems, connections for applying alternating currents from a source of alternating current cophasally to corresponding electrodes of said systems, a pair of gaseous discharge devices having input and output electrodes, circuits coupling the output electrodes of said systems in push pull relation to the input electrodes of said devices, a motor having two windings, means connecting one winding in series with an impedance across said source of alternating current, said impedance being connected effectively in shunt to the output electrodes of one device, means connecting the other winding in series with an impedance across said source of alternating current, said last-named impedance being connected effectively in shunt to the output electrodes of the other device, and a motor rotor associated with said motor windings.

2. A phase comparison and motor control circuit comprising a pair of electron discharge devices each having input and output electrodes, two coaxial lines for applying alternating currents of a first phase in pushpull relation to corresponding electrodes of said devices, a third coaxial line of an electrical length equal to the length of said first lines for applying alternating currents displaced in phase by 90° with respect to said first currents cophasally to corresponding electrodes of said devices, connections for applying other alternating current cophasally to corresponding electrodes of said devices, a motor having two windings, two gaseous discharge tubes the conductivities of which are controlled by the outputs of said first mentioned devices respectively, and separate circuits, each including an alternating current source of the same frequency as said other alternating current and a series impedance, effectively connecting, by means of such impedances, each of the motor windings with the impedance of a different one of said gaseous discharge devices.

3. In signalling apparatus, a first circuit wherein wave energy is developed, a second circuit coupled to said first circuit and tuned substantially to resonance at the frequency of said wave energy, a pair of electron discharge devices each having input and output electrodes, connections from said first circuit to electrodes of said devices for applying wave energy of a first phase from said first circuit antiphasally to the input electrodes of said devices, connections from said second circuit to said input electrodes for applying wave energy from said second circuit cophasally to the input electrodes of said devices, a variable phase shifter in said last named connections for shifting the phase of the applied wave energy about 90°, and tuning control means operated by currents in said devices for tuning said second circuit and the reactance of said phase shifter in accordance with changes in the phase relation, of the currents fed from said first and second circuits to the electrodes of said devices, from a 90° phase relation therebetween.

4. In circuit tuning apparatus, a first circuit wherein wave energy is developed, a second circuit which is tunable coupled to said first circuit and tuned substantially to resonance at the frequency of said wave energy, and means for detecting variations of the relative phases of the wave energies in the two circuits comprising a pair of electron discharge devices each having input and output electrodes, connections from said first circuit to the input electrodes of said devices for applying wave energy of a first phase from said first circuit antiphasally to the input electrodes of said devices, connections from said second circuit to said input electrodes of said devices for applying wave energy from said second circuit cophasally to the input electrodes of said devices, a variable phase shifter in one of said connections for relatively shifting the phases of the wave energy applied to the input electrodes from the respective circuits about 90°, the arrangement as recited providing similar resultant biases on the input electrodes of the two devices when the wave energies in the two circuits are of about the same phase, and dissimilar resultant biases on said input electrodes when relative displacement of the phases of the energies takes place, connections for applying alternating current to be used for tuning purposes cophasally to the input electrodes of said devices, and tuning control means coupled to the output electrodes of said devices and operated by said alternating current amplified in said devices for tuning said second circuit depending on which of said devices has the least negative resultant bias on its input electrodes, said tuning control means also operating to vary the reactance of said phase shifter.

5. In electrical apparatus, a first circuit wherein alternating current of a first phase flows, a second circuit wherein alternating current of substantially the same frequency as said first alternating current flows, and means for comparing the phases of said alternating currents and detecting differences in phase of the currents comprising a pair of electron discharge devices each having an anode, a cathode and a control electrode, two coaxial electrical transmission lines coupling said first circuit to the control electrodes of said electron discharge devices for applying alternating current of said first phase from said first circuit in push pull relation to the control electrodes of said devices, a third coaxial line coupling said second circuit to the cathodes of said devices for applying alternating current of the said same frequency cophasally to the cathodes of said devices, a phase shifter in the couplings between one of said circuits and the electrodes of said devices for displacing the phase of the alternating current fed to said electrodes from said one circuit about 90°, connections for applying other alternating current cophasally to the control electrodes of said devices, and an output circuit coupled to the anode of the two devices.

JOSEPH G. BEARD.
ROBERT F. DRESSLER.

REFERENCES CITED

The following references are of record in the file of this patent:

UNITED STATES PATENTS

| Number | Name | Date |
|---|---|---|
| 2,041,855 | Ohl | May 26, 1936 |
| 2,080,250 | Bedford | May 11, 1937 |
| 2,109,222 | Ryder | Feb. 22, 1938 |
| 2,126,910 | Moseley | Aug. 16, 1938 |
| 2,164,728 | Wey | July 4, 1939 |
| 2,250,532 | Hansell | July 29, 1941 |
| 2,266,052 | Lindner | Dec. 16, 1941 |
| 2,288,339 | Willis | June 30, 1942 |
| 2,304,377 | Roberts | Dec. 8, 1942 |
| 2,340,432 | Schock | Feb. 1, 1944 |
| 2,374,265 | Baker et al. | Apr. 24, 1945 |
| 2,402,210 | Ryder et al. | June 18, 1946 |
| 2,423,228 | Conklin | July 1, 1947 |